April 1, 1952        L. GENDLER        2,590,953
NUT CRACKER
Filed Oct. 18, 1949
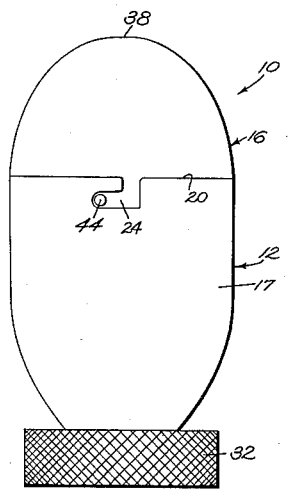
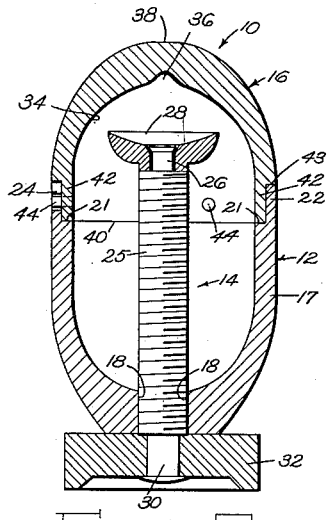
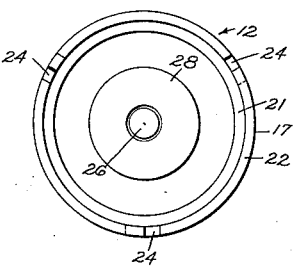
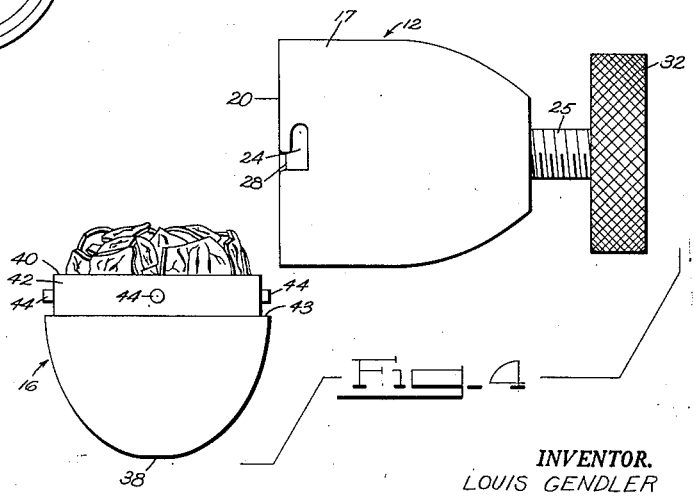
INVENTOR.
LOUIS GENDLER
BY Edwin Levisohn &
Harry Cohn
ATTORNEYS Patented Apr. 1, 1952

2,590,953

UNITED STATES PATENT OFFICE 2,590,953

NUTCRACKER

Louis Gendler, New York, N. Y.

Application October 18, 1949, Serial No. 122,096

5 Claims. (Cl. 146—14)

This invention relates to nut crackers.

One object of the invention is the provision of a nut cracker of such construction that the cracked parts of the nut are prevented from being scattered and are retained in the nut cracker until removed therefrom.

Another object is to provide a nut cracker with a removable part which, when attached to a companion part of the nut cracker, constitutes a part of the means for cracking the nut, and which, when removed from said companion part after the nut is cracked, provides a receptacle for holding the cracked nut.

Another object is the provision of a nut cracker, of improved construction and design, and constituting an ornamental and decorative table article.

The above and other objects, features and advantages of the invention will be fully understood from the following description considered in connection with the accompanying illustrative drawings.

In the drawings:

Fig. 1 is a view in elevation of the nut cracker;

Fig. 2 is a longitudinal sectional view thereof;

Fig. 3 is a top view of the body of the nut cracker, the cap being removed; and

Fig. 4 is a view showing the nut cracker disassembled, the cracked nut being contained in one part thereof.

Referring now to the drawings in detail, the nut cracker 10 of the present invention comprises the body part 12 provided with the operating means 14, and the cap 16, all preferably formed of a suitable metal.

As here shown, the body part 12 is a hollow cup-like member defined by a peripheral side wall 17 and having a threaded aperture 18 at one end thereof and open at the other end thereof, as at 20. At its open end, the body part is provided with an inner shoulder 21 and with a circular lip 22 which is provided with the bayonet slots 24.

The operating means 14 comprise a threaded rod 25, threadedly engaged in the aforementioned aperture 18 of cup 12, and provided at one end with a reduced portion 26 on which a concave nut seat or clamping member or head 28 is secured in a suitable manner. The other end of rod 25 is provided with a portion 30 of reduced diameter which is secured, in a suitable manner, in a knurled preferably circular knob 32. It will be understood that the rotation of knob 32 will cause the rod 16 to move axially of the cup 12 thereby moving the clamping head or jaw 28 axially of said cup into and out of nut-cracking positions, depending upon the direction of rotation of knob 32.

The cap 16 is hollow and is provided with a concave inner surface 34, which is recessed as at 36, and which provides a clamping surface cooperating with head 28, as will presently appear. Said cap is closed at the end 38 thereof and is open at the other end 40 thereof, being provided, at said latter end, with the circular axially extending portion 42 which is offset laterally inwardly of the outer surface of said cap as at 43. Said portion is provided at its outer surface with the radially extending spaced pins 44 which cooperate with the bayonet slots 24, as will presently appear. It will be understood that said pins and slots constitute complementary formations on said cap and cup, respectively, to provide a quick detachable connection therebetween.

To operate the nut cracker 10, the knob 32 is rotated in a counterclockwise direction to retract head 28 into the hollow interior of cup 12. A nut is then placed on said head and the cap 16 is placed over the open end of cap 12, offset 43 abutting the marginal edge of lip 22, the outer surface of circular portion 42 abutting the inner surface of lip 22, the marginal edge of portion 42 abutting shoulder 21 and the pins 44 entering the bayonet slots 24, the cap being rotated to the position indicated in Fig. 1 to prevent the disengagement of the pins from the slots. Then the knob is rotated in a clockwise direction whereby head 28 is carried toward the confronting cap which serves as an abutment against which the nut is cracked with continued rotation of the knob.

When operating the nut cracker, it is preferable to hold the latter in vertical position with cap 16 lowermost, so that all of the cracked nut is disposed in said cap. After the nut is cracked, cap 16 is removed and with it the cracked nut is removed, said cap serving as a receptacle for the cracked nut as illustratively indicated in Fig. 4. In removing the cap with the cracked nut contained therein from the body 12, it will be convenient to hold said body in inverted position before the cap is removed and to remove the cap in said inverted position so that any shell or nut particles will find their way into said cap and thus be removed when the cap is removed. Cup 12 and cap 16 are each preferably peripherally continuous so that said two parts of the nut cracker completely enclose the nut during the cracking operation and hence serve to retain all shell and other portions of the cracked nut in the nut cracker until removed therefrom by removing said cap. The top outer surface 38 of cap 16 is preferably somewhat flat so that said cap will remain upright when placed on a support. It will be understood that due to the complete enclosure formed by the cap and the cup, no part of the nut will be expelled or fall out of the nut cracker, so that when the cup is removed from the cap, the cap being retained in the position indicated in Fig. 4, the entire cracked nut, as a unit, will be disposed within the cap, as indicated.

Although I have illustrated and described a quick detachable connection for the cap and the cup in the form of a bayonet joint comprising cooperating securing means constituted by slots 24 and pins 44, it will be understood that the cap can be secured or locked to the cup in any other suitable manner; for example and not by way of limitation, the cap may be screw-threaded onto the cup.

As indicated in Fig. 1, the knob 32 serves as a base for retaining the nut cracker in upright position on a support when it is not in use. Due to the symmetrical outer contours of the cup and the cap, the substantially oval shaped nut cracker 10 forms a highly desirable ornamental article for a table, or the like.

While I have shown and described the presently preferred embodiment of my invention, it will be understood that various changes in the details of construction and in the form and arrangement of parts may be made without departing from the underlying idea or principles of this invention within the scope of the appended claims.

Having thus described my invention, what I claim and desire to secure by Letters Patent, is:

1. A nut cracker comprising a cupped member and a removable cap for releasably closing one end of said cup and defining with the latter a substantially closed container for a nut, interengaging securing means provided directly on said cupped member and on said cap, respectively, for locking them releasably in fixed relation, said cupped member having a screw-threaded opening at its other end, a screw-threaded rod rotatably mounted in said cupped member and engageable therewith in said threaded opening for movement axially of said cupped member when the rod is turned, and a nut-clamping member carried by said rod at the inner end thereof within the cupped member whereby, when said securing means are mutually engaged, the inner surface of said cap provides a fixed abutment confronting said clamping member to hold the nut against bodily movement in said container while said clamping member is operated to press the nut against said surface in the nut-cracking operation.

2. A nut cracker comprising a cupped member and a removable cap for releasably closing one end of said cup and defining with the latter a substantially closed container for a nut, interengaging securing means provided directly on said cupped member and on said cap, respectively, for locking them releasably in fixed relation, said cupped member having a screw-threaded opening at its other end, a screw-threaded rod rotatably mounted in said cupped member and engageable therewith in said threaded opening for movement axially of said cupped member when the rod is turned, and a nut-clamping member carried by said rod at the inner end thereof within the cupped member, whereby, when said securing means are mutually engaged, the inner surface of said cap provides a fixed abutment confronting said clamping member to hold the nut against bodily movement in said container while said clamping member is operated to press the nut against said surface in the nut-cracking operation, said securing means comprising complementary formations on said cap and said cupped member which constitute a quick detachable connection therebetween to enable them to be quickly placed in said fixed relation and to be released from each other for access to the interior thereof.

3. A nut cracker comprising a cupped member and a removable cap for releasably closing one end of said cup and defining with the latter a substantially closed container for a nut, interengaging securing means provided directly on said cupped member and on said cap, respectively, for locking them releasably in fixed relation, said cupped member having a screw-threaded opening at its other end, a screw-threaded rod rotatably mounted in said cupped member and engageable therewith in said threaded opening for movement axially of said cupped member when the rod is turned, and a nut-clamping member carried by said rod at the inner end thereof within the cupped member, whereby, when said securing means are mutually engaged, the inner surface of said cap provides a fixed abutment confronting said clamping member to hold the nut against bodily movement in said container while said clamping member is operated to press the nut against said surface in the nut-cracking operation, said cap being provided with a surface formation which is releasably received in a complementary formation provided on said cupped member, said formations constituting said securing means.

4. A nut cracker comprising a cupped member and a removable cap for releasably closing one end of said cup and defining with the latter a substantially closed container for a nut, interengaging securing means provided directly on said cupped member and on said cap, respectively, for locking them releasably in fixed relation, said cupped member having a screw-threaded opening at its other end, a screw-threaded rod rotatably mounted in said cupped member and engageable therewith in said threaded opening for movement axially of said cupped member when the rod is turned, and a nut-clamping member carried by said rod at the inner end thereof within the cupped member, whereby, when said securing means are mutually engaged, the inner surface of said cap provides a fixed abutment confronting said clamping member to hold the nut against bodily movement in said container while said clamping member is operated to press the nut against said surface in the nut-cracking operation, said securing means comprising pin formations on said cap, and complementary slotted formations on said cupped member which constitute a quick detachable connection therebetween to enable them to be quickly placed in said fixed relation and to be released from each other for access to the interior thereof.

5. A nut cracker comprising a cupped member and a removable cap for releasably closing one end of said cup and defining with the latter a substantially closed container for a nut, interengaging securing means provided directly on said cupped member and on said cap, respectively, for locking them releasably in fixed relation, said cupped member having a screw-threaded opening at its other end, a screw-threaded rod rotatably mounted in said cupped member and engageable therewith in said threaded opening for movement axially of said cupped member when the rod is turned, and a nut-clamping member carried by said rod at the inner end thereof within the cupped member, whereby, when said securing means are mutually engaged, the inner surface of said cap provides a fixed abutment confronting said clamping member to hold the nut against bodily movement in said container while said clamping member is operated to press the nut against said surface in the nut-cracking operation, and a knob at the outer end of said rod externally of the cupped member for turning said rod and having an end surface providing means to support the cupped member in vertical position when not in use.

LOUIS GENDLER.

REFERENCES CITED

The following references are of record in the file of this patent:

UNITED STATES PATENTS

| Number | Name | Date |
|---|---|---|
| D. 117,623 | Tourian | Nov. 14, 1939 |
| 386,804 | Casey | July 31, 1888 |
| 706,179 | Hordish | Aug. 5, 1902 |
| 1,219,859 | Paxton | Mar. 20, 1917 |
| 1,556,424 | Cook | Oct. 6, 1925 |
| 2,016,050 | Quackenbush | Oct. 1, 1935 |
| 2,269,052 | Colvin | Jan. 6, 1942 |

FOREIGN PATENTS

| Number | Country | Date |
|---|---|---|
| 204,363 | Germany | Nov. 21, 1908 |
| 179,225 | Canada | Sept. 11, 1917 |